B. F. STAUFFER.
PROCESS OF SECURING NECK CLOSURES IN HOT WATER BOTTLES.
APPLICATION FILED DEC. 31, 1914.
1,146,741.
Patented July 13, 1915.
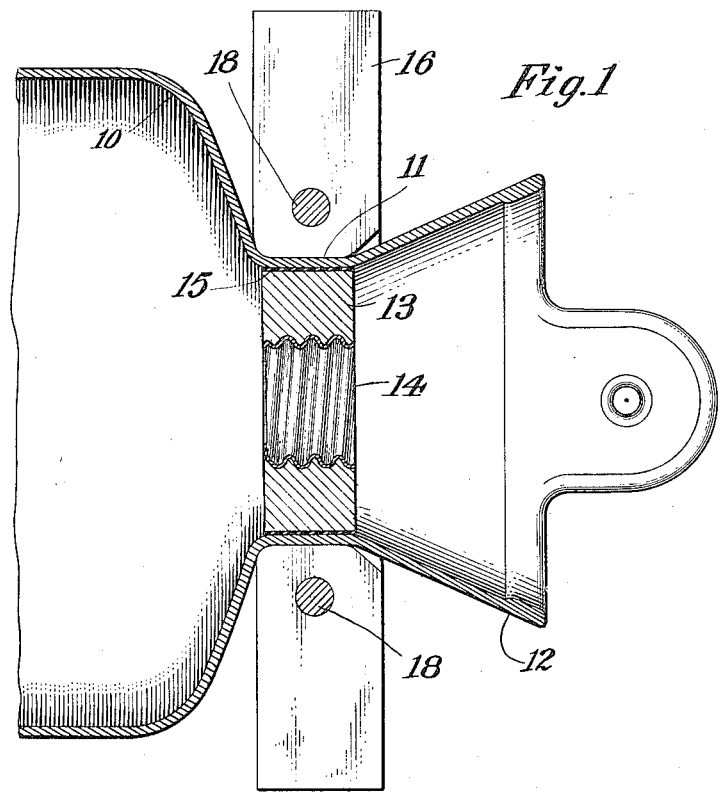
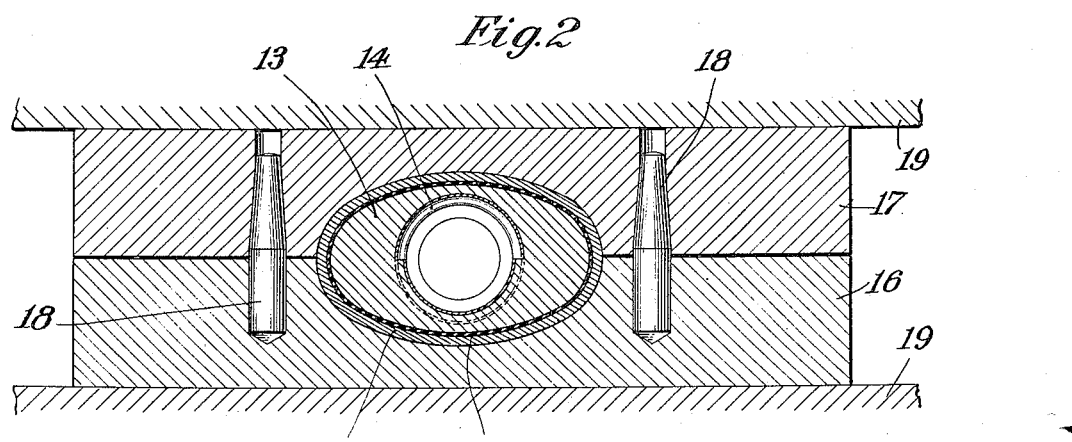
Witnesses:
Cora Williams
Illa N. Kim
Inventor
Burton F. Stauffer
By his Attorney
Robert M. Pierson

UNITED STATES PATENT OFFICE.

BURTON F. STAUFFER, OF AKRON, OHIO, ASSIGNOR TO THE B. F. GOODRICH COMPANY, OF NEW YORK, N. Y., A CORPORATION OF NEW YORK.

PROCESS OF SECURING NECK-CLOSURES IN HOT-WATER BOTTLES.

1,146,741.  Specification of Letters Patent.  Patented July 13, 1915.

Application filed December 31, 1914. Serial No. 879,839.

*To all whom it may concern:*

Be it known that I, BURTON F. STAUFFER, a citizen of the United States, residing at Akron, in the county of Summit and State of Ohio, have invented certain new and useful Improvements in Processes of Securing Neck-Closures in Hot-Water Bottles, of which the following is a specification.

This invention relates to the manufacture of wide-mouthed molded rubber hot-water bottles. Bottles of this type are molded in a single piece, and the metal molding core is withdrawn through the neck of the bottle, whose walls stretch sufficiently to permit the passage of said core. Since the screw stopper and its socket are smaller than the aperture of the neck, the latter requires to be filled with a plug or partial closure usually made of metal, hard rubber, or semi-hard rubber, and having the socket or female thread for the stopper formed or embedded in said closure plug.

Heretofore the practice in making a water-tight joint between the plug or partial closure and the neck of the bottle, has been to cement said plug in the neck with ordinary rubber solution and bind the neck on the outside with a metal band or wire underlaid usually with a strip of frictioned fabric to prevent the wire from cutting the rubber, there being also usually a strip of frictional fabric wrapped around the plug. The wire is then covered with a band of cured rubber cemented in place in order to give a sightly appearance to the finished bottle neck. There are several objections to this method of making a joint, chief among which is the tendency of the rubber band, which covers the binding wire, to peel off or check and fall off after a time and leave the wire and fabric strip exposed.

My invention has for its object to overcome these objections, and I accomplish this by the herein described method of forming a water-tight joint which avoids any external wrapping of the bottle neck and considerably reduces the cost of making the joint.

In the preferred form of my invention, I interpose between the plug or partial closure and the neck walls of the bottle a thin layer of vulcanizable rubber to act as a cement between the two surfaces, this cementing rubber having such a proportion of sulfur that it will cure in a very few minutes when heated, whereby I avoid the over-curing of the already vulcanized neck walls of the bottle, and I then compress the bottle neck upon the plug between metal mold surfaces, shaped to conform to the neck, and heated in any suitable manner, as by mounting them between the usual heated press plates. The result is a water-tight joint and a smooth external neck surface on the bottle.

Of the accompanying drawings, Figure 1 represents a horizontal sectional view of a hot-water bottle and closure, together with a mold which may be employed in carrying out my invention. Fig. 2 represents a vertical sectional view of the bottle neck and a portion of the press plates.

In the drawings, 10 is the body, 11 the neck, and 12 the funnel of a hot-water bottle of the type described—that is, a one-piece molded bottle having a mouth wide enough for the withdrawal of the metal molding core without tearing the rubber as it stretches over said core.

13 is an elliptical plug or partial closure which may be made in the usual way of hard or semi-hard rubber, either with or without an embedded metallic screw socket 14 for the reception of the stopper (or the plug could be made entirely of sheet metal in a known manner), and 15 represents a thin layer of cementing rubber interposed between said plug and the bottle neck 11.

Preferably I first roughen the periphery of the plug and the inner surface of the bottle neck, apply a coat of quick-curing rubber solution to the roughened surface of the plug, wrap the latter with a thin strip of quick-curing rubber to insure sufficient thickness in the cementing layer, coat the exterior of this strip and the interior of the bottle neck with a quick-curing rubber solution, and insert the plug in place in the bottle neck. The plug is slightly larger than the aperture in the neck so as to stretch the latter slightly and cause it to grip the plug and thereby promote the fluid-tightness of the joint. There is then applied to the bottle neck a mold shaped to conform thereto as closely as possible, and preferably engaging the same only in the zone of the plug so as to localize the heat. 16, 17 represent the two halves of said mold connected by dowel pins 18. This mold is placed between the steam-heated plates 19 of an ordinary vulcanizing press, and the bottle neck is thereby brought under compression and the joint heated until the cementing rubber 15 vulcanizes. The vulcanization should occupy from three to five minutes in order to avoid any possibility of over-curing the walls of the bottle, although this time may be varied more or less according to the conditions.

The details of the process may be varied. For example, I may dispense with the strip of green rubber around the plug and use a heavy plastic or liquid cement instead; and I may otherwise modify the practice of the invention within the scope of the claims.

I claim:

1. The herein-described process of plugging wide-necked molded rubber bottles which consists in inserting a plug or partial closure in the neck of the bottle after the latter has been vulcanized, interposing between the two a layer of cementing rubber which will cure by the application of heat in a time too brief to cause over-curing of the neck walls of the bottle, and compressing the bottle neck between heated metal surfaces to cure said cementing layer.

2. The herein-described process of plugging wide-necked molded rubber bottles which consists in inwrapping the plug or partial closure with a band of quick-curing rubber between which and the plug is interposed a film of quick-curing rubber solution, coating the periphery of the wrapped plug with quick-curing rubber solution, inserting said plug in the neck of a vulcanized bottle which is slightly smaller than the plug and is stretched thereby, and compressing the neck of the bottle upon said plug between heated metal surfaces.

In testimony whereof I have hereunto set my hand in the presence of two subscribing witnesses, this 29 day of December 1914.

BURTON F. STAUFFER.

Witnesses:
 WALTER K. MEANS,
 ILLA N. KIRN.